Figure 1:
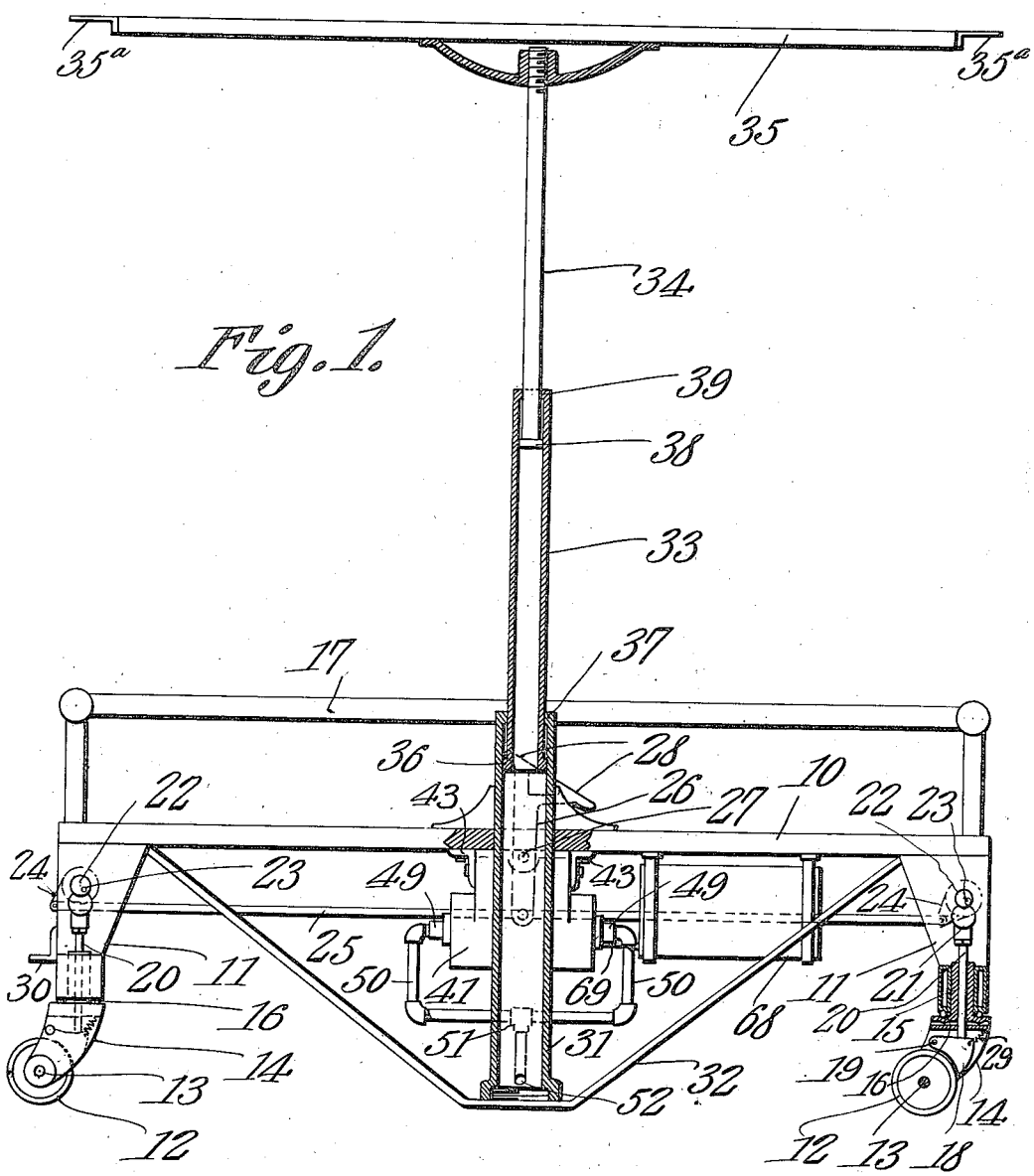

B. F. SEIBERT.
TRUCK.
APPLICATION FILED OCT. 6, 1909.

961,807.

Patented June 21, 1910.
2 SHEETS—SHEET 1.

Witnesses

Inventor
Bennett F. Seibert.
By C. A. Snow & Co.
Attorneys

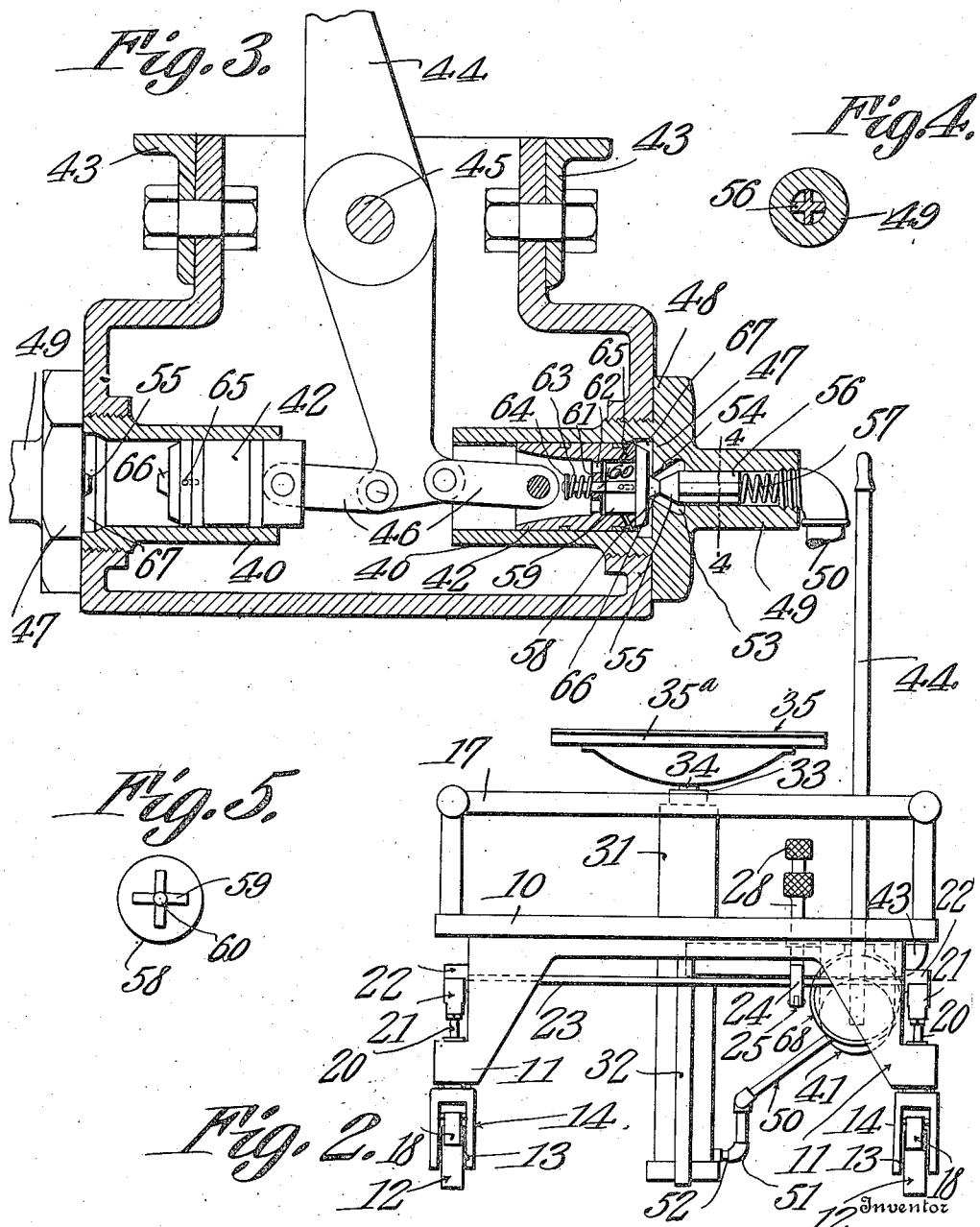

UNITED STATES PATENT OFFICE.

BENNETT F. SEIBERT, OF MANSFIELD, OHIO.

TRUCK.

961,807.

Specification of Letters Patent.  Patented June 21, 1910.

Application filed October 6, 1909. Serial No. 521,234.

*To all whom it may concern:*

Be it known that I, BENNETT F. SEIBERT, a citizen of the United States, residing at Mansfield, in the county of Richland and State of Ohio, have invented a new and useful Truck, of which the following is a specification.

The truck which is the subject of the present invention is designed more particularly for conveying and elevating caskets to their crypts in a mausoleum, and it consists in certain novel structural details to be hereinafter described and claimed.

It is the object of the present invention to provide the truck with caster wheels which are so mounted that the truck can be readily moved to different parts of the mausoleum, and also to provide a brake which can be applied irrespective of the position of the caster wheels.

Another object is to provide the truck with improved means for elevating the casket, the same consisting of a fluid pressure apparatus, comprising a multiple telescoping plunger, working in a fluid pressure cylinder, and a pump which may be conveniently operated from the platform of the truck.

In the accompanying drawing forming a part of this specification, Figure 1 is a front elevation, partly in section, of a truck constructed in accordance with the present invention, showing the casket supporting platform in elevated position. Fig. 2 is an end view showing said platform lowered. Fig. 3 is a sectional view of the pump for charging the fluid pressure cylinder. Fig. 4 is a transverse section on the line 4—4 of Fig. 3. Fig. 5 is a rear end view of the plunger valve hereinafter referred to.

Referring more particularly to the drawing, the truck comprises a platform 10 having legs 11 at its four corners. The legs are fitted with caster wheels 12 which are swiveled so that they may swing around and accommodate themselves to the direction in which the truck is traveling. Each caster wheel is mounted on an axle 13 carried by a yoke 14 having an upstanding stem 15. On the legs 11 are bearings in which the stems 15 are journaled, whereby the swivel supports for the caster wheels are had. Antifriction balls 16 are interposed between the bottom of the legs, and the top of the yoke, so that the caster wheels may swing freely on the vertical pivot. The platform 10 is provided with a railing 17 forming a hand hold for the attendants when moving the truck about.

A brake is provided for firmly locking the caster wheels 12 when the truck arrives at its destination. The brake comprises shoes 18 pivoted at 19 between the branches of the yokes 14, so that they may be swung into engagement with the rims of the caster wheels. The stems 15 have axial bores in which are slidably mounted brake actuating-stems 20, adapted to engage the top of the shoes 18, and force the same against the rims of the caster wheels. Inasmuch as the stems 20 coincide with the vertical pivotal axes of the caster wheels, it will be evident that the brakes can be applied irrespective of the direction in which the wheels may be swung. On the upper end of each stem 20 is a knuckle 21 which is engageable by a cam 22 fast on a rock shaft 23. Each caster wheel is provided with the herein described brake mechanism, and two rock shafts are provided for operating the several brake shoes, one of said shafts being journaled in the legs 11 at one end of the truck, and the other shaft in the legs at the other end of the truck. On each shaft 23 is made fast a rocker arm 24, and these rocker arms are connected by a link 25. Between its ends, the link is connected to a foot lever 26 fulcrumed at 27 on a bracket mounted on the under side of the platform 10. The lever extends through an opening in the platform, and above the same has two diverging branches 28, each of which is provided with a foot piece. Upon rocking the shaft 23 in one direction, the cams 22 force the stems 15 downwardly to engage the brake shoes with the rim of the caster wheels, and upon rocking the shaft in the opposite direction, the cams release the stems, whereupon the brake shoes are swung away from the rims of the caster wheels by springs 29 connected at one of their ends to the brake shoes, and at their other ends to the yoke 14.

At one end of the truck is a step 30, which affords an easily accessible approach to the platform, the latter being designed to furnish a working table for the operator, high enough to allow caskets to be moved from the elevating table or platform to be presently described, without the use of ladders.

Mounted centrally on the platform 10, is a fluid pressure cylinder 31 which rises a suitable distance from the platform, and also extends below the same through an opening therein, it being supported at its lower end by a bracket 32 carried by the platform. In this cylinder works a plunger consisting of two telescoping sections 33 and 34, respectively, the latter carrying at its upper end a platform 35 on which the casket to be elevated is placed. On the ends of the platform are angle strips 35ª. On the plunger section 33 is a shoulder 36 which is engageable with a shoulder 37 in the cylinder 31, for limiting the upward travel of said section, and the upward travel of the plunger section 34 is limited by a shoulder 38 thereon, engageable with a shoulder 39 in the plunger section 33. Any other suitable means may be provided for limiting the upward movement of the plunger section.

Motive fluid is supplied to the cylinder 31 by a pump mechanism shown in Figs. 3 to 5. The pump comprises a pair of cylinders 40 mounted in axial alinement in a casing 41. In each cylinder works a piston 42. The casing 41 is mounted on the under side of the platform 10, it being bolted or otherwise secured to angle irons 43 on the platform. The top of the casing is open, and through said open top, a hand lever 44 extends into the casing, the said hand lever being fulcrumed therein on a suitable pivot 45 mounted on the walls of the casing. The hand lever is connected by links 46 to the respective pistons 42, and it extends through an opening in the platform 10, and rises a suitable distance above the same, to one side of the cylinders 31 and the parts carried thereby, so that it may be operated by an attendant standing on the platform.

The pump cylinders 40 are mounted in openings in opposite ends of the casing 41, said openings being screw threaded so that the cylinders may be screwed thereinto. The inner ends of the cylinders are open, so that the connection between the hand lever 44 and the pistons 42 may be made. The outer ends of the cylinders are formed with heads 47 having shoulders 48 which abut against the outer surface of the casing at the ends thereof. The heads are formed with nipples 49 to which are connected pipes 50 leading to a T-coupling 51, from which a pipe 52 leads to and enters the cylinder 31 at the lower end thereof.

In each head 47, and opening to the bore of the respective pump cylinders 40, is a recess 53 formed with a valve seat 54, on which is adapted to seat a check valve 55, having guide wings 56, which work in the bore of the nipple 49. Between the inner ends of the guide wings, and the inner end of the pipe 50, is located a coiled spring 57 which serves to hold the check valve normally seated.

The pump pistons 42 are open on both ends, and on those ends next to the heads 47, are seated valves 58, said valves having guide wings 59 working in the bores of the pistons, and also provided with a stem 60 passing loosely through a partition 61 formed in the bore of the pistons, said partition having a plurality of openings 62 to establish communication between the bore on opposite sides of the partition. A spring 63 is coiled around the stem 60 between one side of the partition and a washer 64 fastened on the stem, this spring serving to normally hold the valve 58 seated. Adjacent to the seat of said valve, which is the end of the piston, ports 65 open from the bore of the piston through the sides thereof, and the outer end of the valve is formed with a lug 66, which is in alinement with the check valve 55, for a purpose to be presently described. That end of the bore of the pump cylinder 40 in which the valved end of the piston works, is enlarged as indicated at 67. Carried on the bottom of the platform 10 is a tank 68 containing oil, water or other fluid, and connected by a pipe 69 to the casing 41. If the motive fluid is air, the tank 68 may be dispensed with.

The mode of operation is as follows: After the casket is placed upon the platform 35, one or more attendants proceed to move the truck to the desired place or position in the mausoleum where the receiving crypt or cell has been prepared. The truck can be readily moved about by grasping the hand rail 17, the caster wheels swinging around and accommodating themselves to the direction in which the truck is pushed or pulled. The truck should be moved until the desired end of the casket faces the opening in the receiving crypt or cell. After the truck is in position, the operator mounts the platform, and firmly locks all the caster wheels by the brake mechanism herein described, after which the platform 35 is elevated by operating the hand lever 44. The pumping operation is continued until the casket is elevated to the desired level. The angle strip 35ª is adapted to be brought into engagement with the floor of the crypt, and thus support the platform 35 until the casket is delivered. On the suction stroke of the piston 42, the valve 58 opens, and on the compression stroke this valve closes, and the motive fluid is forced past the check valve 55, and by the way of the pipes 50 and 52 to the cylinders 31. The check valve 55 closes on the suction stroke.

To lower the platform 35 it is necessary to exhaust the motive fluid from the cylinder 31, which is done in the following manner: The hand lever 44 is forced to the extreme end of its stroke in either direction. This operation brings the lug 66 in contact with the check valve 55, and forces the same off its seat, and at the same time brings the ports 65 into the enlarged portion 67 of the bore of the pump cylinder 40. The motive fluid is then free to flow back into the casing 41, it passing through the pipes 52 and 50, into the bore of the nipple 49, past the valve 55, into the enlarged portion 67 of the bore of the pump cylinder, through the ports 65 into the bore of the pump piston 42, and through the opening 62 in the partition 61, and out of the bore of the pump piston into the casing 41, from which it flows back into the tank 68 if the latter is provided. When the plunger sections 33 and 34 are being elevated, the section 33 first moves outwardly until its shoulder 36 engages with the shoulder 37, whereupon the section 34 commences to move outwardly, and continues to do so until the shoulder 38 engages the shoulder 39, this being the limit of the outward movement. When the motive fluid is exhausted from the cylinders 31, the plunger sections drop back thereinto.

The apparatus herein described is simple in structure, and can be easily operated, and it therefore effectually serves the purpose for which it is designed. By providing the herein described exhaust mechanism, there is not waste of motive fluid if the same is water, oil or some other liquid.

What is claimed is:

The combination of a wheeled platform, a fluid pressure cylinder carried thereby, a plunger working in the cylinder, a platform carried by the plunger, a casing mounted beneath the platform, said casing being open on top, and the platform having an opening over the same, a pump cylinder mounted in the casing for charging the aforesaid cylinder, a lever fulcrumed in the casing, and extending through the open top thereof and through the opening in the platform, a piston working in the pump cylinder, and a connection between the piston and the lever.

In testimony that I claim the foregoing as my own, I have hereto affixed my signature in the presence of two witnesses.

BENNETT F. SEIBERT.

Witnesses:
M. H. ACKERMAN,
PHILIP ACKERMAN.